United States Patent
Matsumoto et al.

(12)

(10) Patent No.: US 7,059,918 B2
(45) Date of Patent: Jun. 13, 2006

(54) ELECTRICAL CONNECTOR AND TERMINAL HOLDER

(75) Inventors: Mitsuhiro Matsumoto, Shizuoka (JP); Hirotaka Fukushima, Shizuoka (JP); Hidehiko Kuboshima, Shizuoka (JP); Chitoshi Nakamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/798,453

(22) Filed: Mar. 12, 2004

(65) Prior Publication Data

US 2004/0235364 A1 Nov. 25, 2004

(30) Foreign Application Priority Data

May 20, 2003 (JP) .............................. 2003-142310

(51) Int. Cl.
*H01R 13/514* (2006.01)
(52) U.S. Cl. ................................... 439/752
(58) Field of Classification Search ................ 439/752, 439/585, 877
See application file for complete search history.

(56) References Cited

U.S. PATENT DOCUMENTS 5,026,304 A * 6/1991 Furrow ....................... 439/595
5,504,275 A * 4/1996 Scramoncin ................. 439/877
6,200,172 B1 * 3/2001 Konoya et al. .............. 439/752
6,334,798 B1 * 1/2002 Ushijima et al. ............ 439/877
6,461,184 B1 * 10/2002 Nimura ....................... 439/352

FOREIGN PATENT DOCUMENTS

JP 11-126661 5/1999

* cited by examiner

*Primary Examiner*—Gary F. Paumen
*Assistant Examiner*—Larisa Tsukerman
(74) *Attorney, Agent, or Firm*—Armstrong, Kratz, Quintos, Hanson & Brooks, LLP

(57) ABSTRACT

An electrical connector has a terminal piece connected to an electrical cable, a connector housing receiving the terminal piece, and a terminal holder attached to the connector housing. The holder presses the terminal piece against a wall of the connector housing so that the terminal piece is sandwiched between the wall and the holder. The holder has a first boss projecting from a base plate of the holder toward the retainer wall such that the first boss can contact a main plate of the terminal piece to press the main plate against a retainer wall of the connector housing. The holder has a second boss projecting from the base plate toward the retainer wall such that the second boss can contact a cable connection end of the terminal piece to press the cable connection end against the retainer wall.

15 Claims, 8 Drawing Sheets

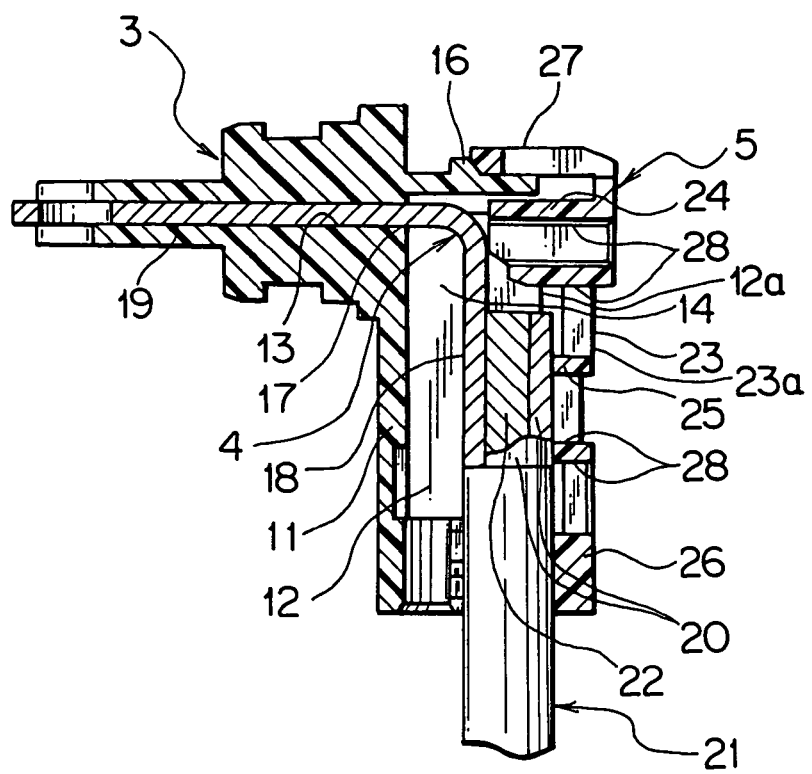
F I G. 7
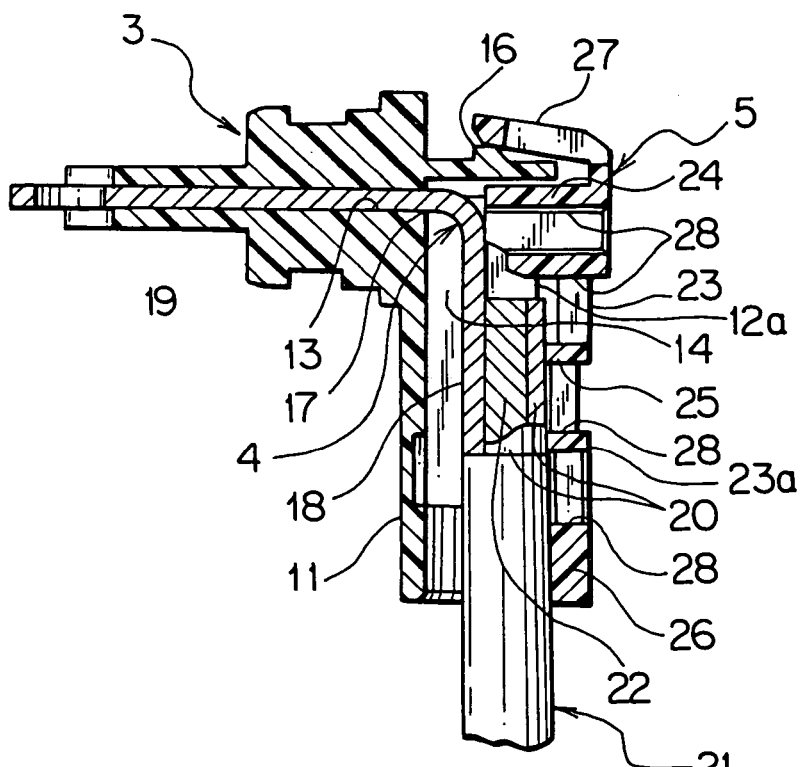
F I G. 8

ELECTRICAL CONNECTOR AND TERMINAL HOLDER

BACKGROUND OF THE INVENTION

1. Field of the Invention

The present invention relates to an electrical connector used for connection of electrical cables.

2. Related Art

In automotive vehicles, there are provided various types of electrical instruments, for which the vehicle is arranged with wiring harnesses to supply signals and power to the instruments. Each wiring harness has a plurality of electrical cables and electrical connectors joined to the cables.

The automotive vehicles include an electric car, a hybrid car, and a fuel-cell powered car, in which various types of electric instruments such as an inverter and a motor are mounted. In FIGS. 15 and 16, there is shown an electrical connector 101 used for such types of instruments. Such a connector is disclosed in Japanese Patent Application Laid-open No. H. 11-126661.

The connector 101 has a case 102, a cover 103, a connection terminal 104 connected to an electric instrument (FIG. 16), and another connection terminal 105 (FIG. 16) connected to an electrical power source. The case 102 has a cylindrical housing with a bottom plate. As illustrated in FIG. 16, the case 102 receives a terminal retainer 106 composing a holder. The terminal retainer 106 is cylindrical.

The cover 103 is attached to the case 102 to cover an opening of the case 102. The connection terminal 104 directed to the instrument is a comparatively thick plate, of which an end extends from the case 102 and the other end is within the case 102. The connection terminal 104 electrically connects to an inverter 107 as shown by chain lines in FIG. 16.

The connection terminal 105 connected to the electrical power side is cylindrical and received in the terminal retainer 106. The connection terminal 105 has an end connected to an electrical cable 108 and the other end connected to the connection terminal 104 with a securing bolt 109. Around the electrical cable 108, a rubber stopper 110 is provided to prevent intrusion of a liquid such as water. The connector 101 is used for supplying an electrical power through the electrical cable 108 to an electric instrument such as the inverter 107.

The case 102 of the conventional connector 101 accommodates the whole terminal retainer 106 within the case 102. Thus, the case 102 becomes larger in size. Furthermore, the case 102 tends to increase in size, since the case 102 accommodates the connection terminals 104 and the holder 105 that are joined to each other with bolts 109. Moreover, the rubber stopper 110 attached to the electrical cable 108 increases the size of the connector 101.

Particularly, the connector 101 shown in FIGS. 15, 16 tends to extend from the inverter 107 by a comparatively larger length. That is disadvantageous in electrical interference with other electrical instruments.

Therefore, an object of the present invention is to provide a connector having a holder, which can be smaller in size as compared with the conventional one.

SUMMARY OF THE INVENTION

For achieving the object, the present invention provides a terminal holder that is a first aspect of the invention. The terminal holder is attached to a connector housing receiving a terminal piece connected to an electrical cable. The holder presses the terminal piece against a wall of the connector housing so that the terminal piece is sandwiched between the wall and the holder to secure the terminal piece in the connector housing. Thus, the terminal piece can be surely secured in the connector housing with a reduced depth of the connector housing. This achieves a smaller size of the connector itself. The holder is moved toward the connector housing along a radial direction of the electrical cable, when the holder is attached to the connector housing and presses the terminal piece against the wall of the connector housing. The connector housing includes a retainer wall having a surface for positioning the terminal piece and the electrical cable, and the holder has a base plate spaced from and opposed to the retainer wall. The terminal piece and the electrical cable are positioned between the retainer wall and the base plate of the holder. The holder has a first boss projecting from the base plate toward the retainer wall such that the first boss can contact the main plate of the terminal piece to press the main plate against the retainer wall.

The terminal piece has a cable connection end joined to a core of the electrical cable, and the holder has a second boss projecting from the base plate toward the retainer wall such that the second boss can contact the cable connection end of the terminal piece to press the cable connection end against the retainer wall. This positions the cable connection end at a predetermined location to prevent the cable connection end from being offset from the predetermined location in the connector housing.

Preferably, the holder has a third boss projecting from the base plate toward the retainer wall such that the third boss can contact the electrical cable connected to the terminal piece to press the electrical cable against the retainer wall.

Preferably, the connector housing has a locking member, and the base plate of the holder has a locked portion engaged with the locking member when the holder is attached to the connector housing.

Preferably, the connector housing has a through hole to lead a sealing material to fill an inner space of the connector housing after the holder has attached to the connector housing. This prevents intrusion of a liquid such as water into the connector housing to enable a sure waterproof performance for the terminal piece and the cable core in the connector housing. Furthermore, a smaller amount of the sealing material is required for filling the connector housing since the holder is received in the connector housing, reducing a manufacturing cost of the connector.

Preferably, the holder has a stopper to prevent the sealing material from leaking out from the connector housing. Thus, the sealing material is surely sealed in the connector housing.

Preferably, the holder has an outer surface that become flush with an outer surface of the connector housing when the holder has attached to the connector housing. This achieves a smaller size of the connector.

A second aspect of the invention is an electrical connector including a terminal piece connected to an electrical cable, a connector housing receiving the terminal piece, and a terminal holder attached to the connector housing. The holder presses the terminal piece against a wall of the connector housing so that the terminal piece is sandwiched between the wall and the holder to secure the terminal piece in the connector housing.

Preferably, the terminal piece has a cable connection end joined to a core of the electrical cable, and the holder has a second boss projecting from the base plate toward the retainer wall such that the second boss can contact the cable connection end of the terminal piece to press the cable connection end against the retainer wall.

Preferably, the connector housing has a through hole to lead a sealing material to fill an inner space of the connector housing after the holder has attached to the connector housing.

Preferably, the holder has a stopper to prevent the sealing material from leaking out from the connector housing.

Preferably, the holder has an outer surface that becomes flush with an outer surface of the connector housing when the holder has been attached to the connector housing.

Preferably, the electrical cable has an oblong section, and the electrical cable has an outer surface extending along a longitudinal direction of the electrical cable. The electrical cable abuts against the outer surface, and the terminal piece is connected to a core of the electrical cable.

A third aspect of the invention is a connector having a terminal piece connected to the electrical cable and a connector housing receiving the terminal piece. The electrical cable has an oblong section. The terminal piece is welded to a longitudinal surface of the core of the electrical cable. Thus, the terminal piece can be surely secured in the connector housing with a reduced depth of the connector housing. This achieves a smaller size of the connector itself. Furthermore, this configuration can surely electrically connect the terminal piece to the electrical cable.

Preferably, the connector housing is received in an electrically shielding case, and the electrical cable is covered with an electrically shielding sheet. The connector has a fastener that pinches an end of the electrically shielding sheet against the case. The size of the electrically shielding sheet is selected to be applied to electrical cables having different diameters, which allows a reduced manufacturing cost of the connector.

BRIEF DESCRIPTION OF THE DRAWINGS

FIG. 7 is a sectional view showing a state in which the connector housing of FIG. 3 is going to receive the terminal bar and the holder;

FIG. 8 is a sectional view showing a state in which a locking arm of the holder of FIG. 7 is resiliently deflecting;

DETAILED DESCRIPTION OF THE PREFERRED EMBODIMENTS

Referring to FIGS. 1 to 9, a terminal holder and a connector according to a first embodiment of the present invention will be discussed.

Figure 1:
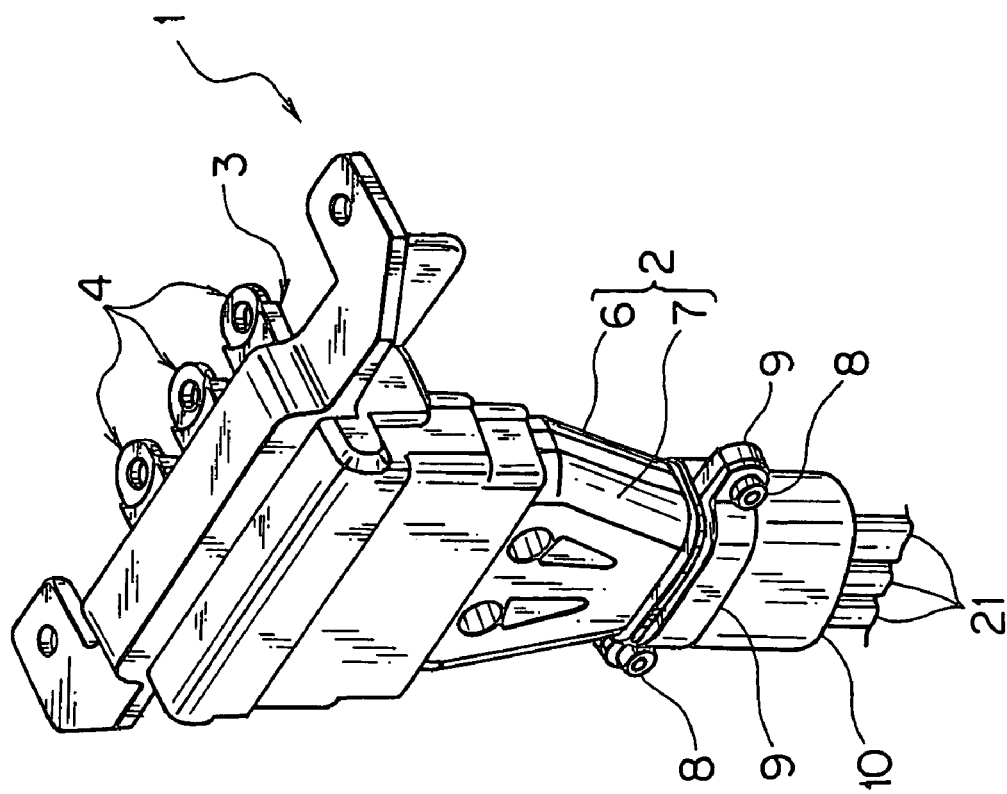
FIG. 1 is a perspective view showing a connector of a first embodiment of the present invention.
Figure 2:
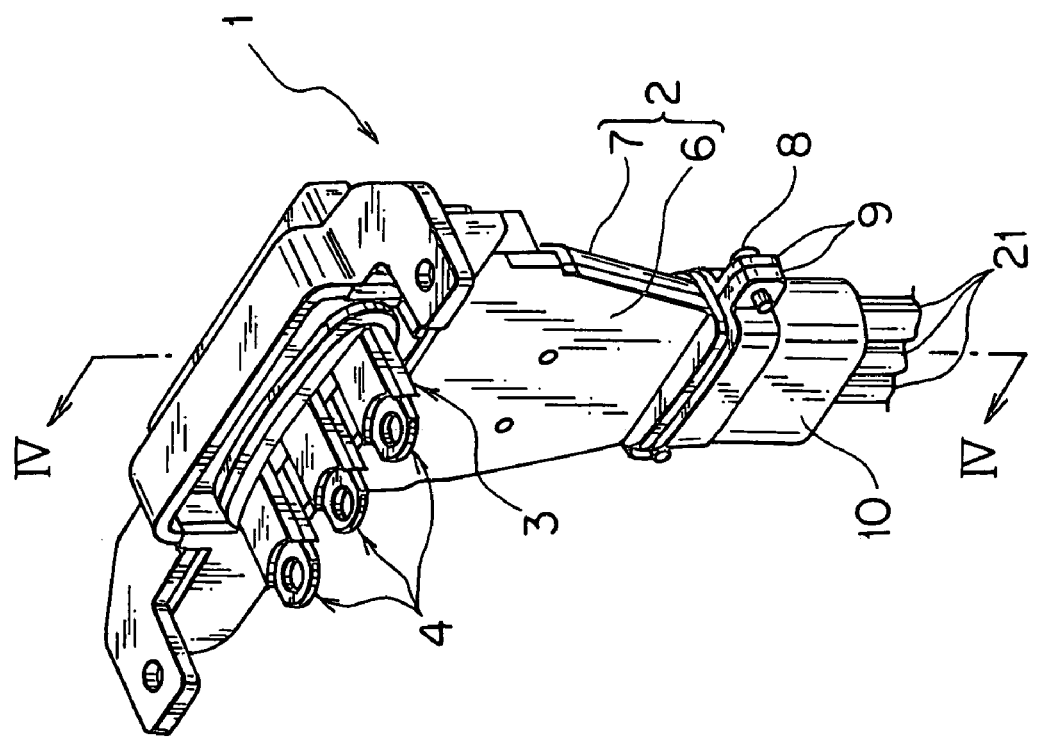
FIG. 2 is a perspective rear view showing the connector of FIG. 1.

A connector 1 shown in FIGS. 1 and 2 is disposed, for example, between an inverter and a motor in an electric car, a hybrid car, or a fuel-cell powered car for supplying an electrical power from the inverter to the motor. The connector 1 is mounted on the inverter that is an electric instrument disposed in the car.

Figure 4:
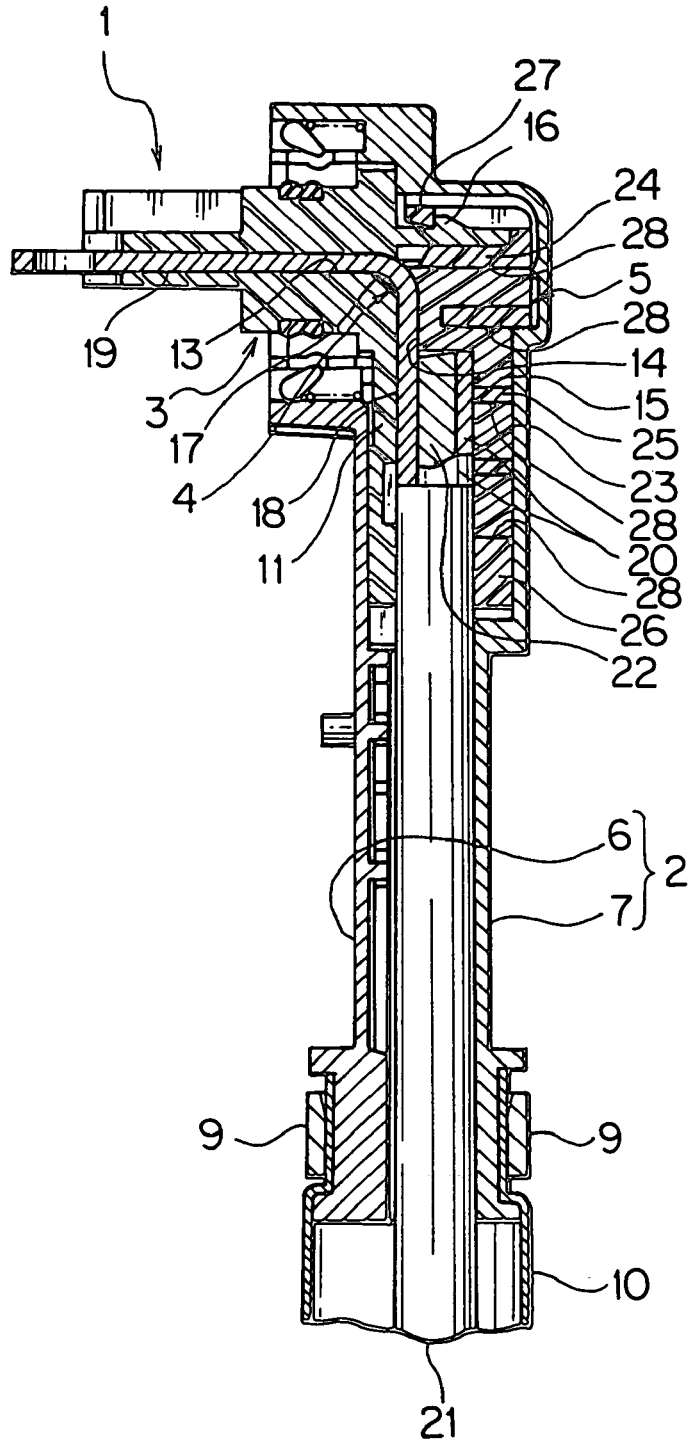
FIG. 4 is a sectional view taken along line IV—IV of FIG. 1.
Figure 5:
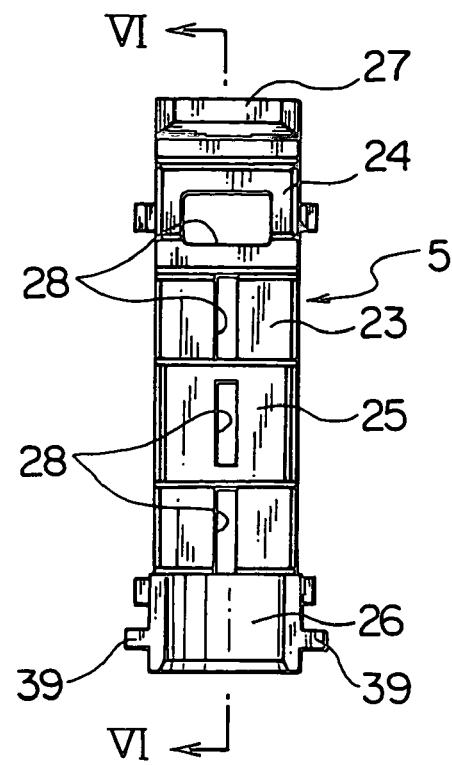
FIG. 5 is a front view showing the holder of FIG. 3.
Figure 6:
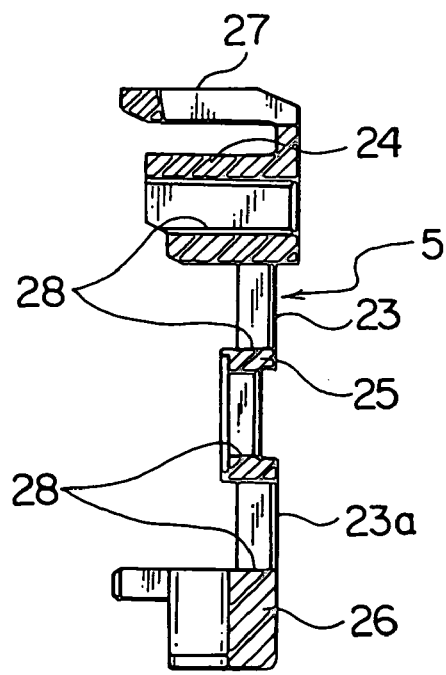
FIG. 6 is a sectional view taken along line VI—VI of FIG. 3.

As illustrated in FIG. 4, the connector 1 has a covering case 2 made of an electrical shielding material, a connector housing 3, a plurality of terminal bars (terminal pieces) 4, and a plurality of terminal holders (terminal retainers) 5. As illustrated in FIGS. 1 and 2, the covering case 2 has a pair of case bodies 6, 7 coupled to each other. The case bodies 6 and 7 are made of an electrically shielding material such as an aluminum alloy and define a flat box when mated with each other.

The case bodies 6, 7 have shapes to fit with contours of the connector housing 3 and the holder 5 to receive them. The case 2 receives the connector housing 3.

Around the case 2, a pair of fasteners 9 are attached with screws 8 (see FIGS. 1 and 2). The fasteners 9 are made of an electrical shielding material and define a ring band to surround the case 2 when attached.

The fasteners 9 pinch and secure an end of a mesh sheet 10 on the case 2. The mesh sheet 10 is an electrically shielding sheet and will be discussed later. The fasteners 9 also connect the case 2 to the mesh sheet 10.

Figure 3:
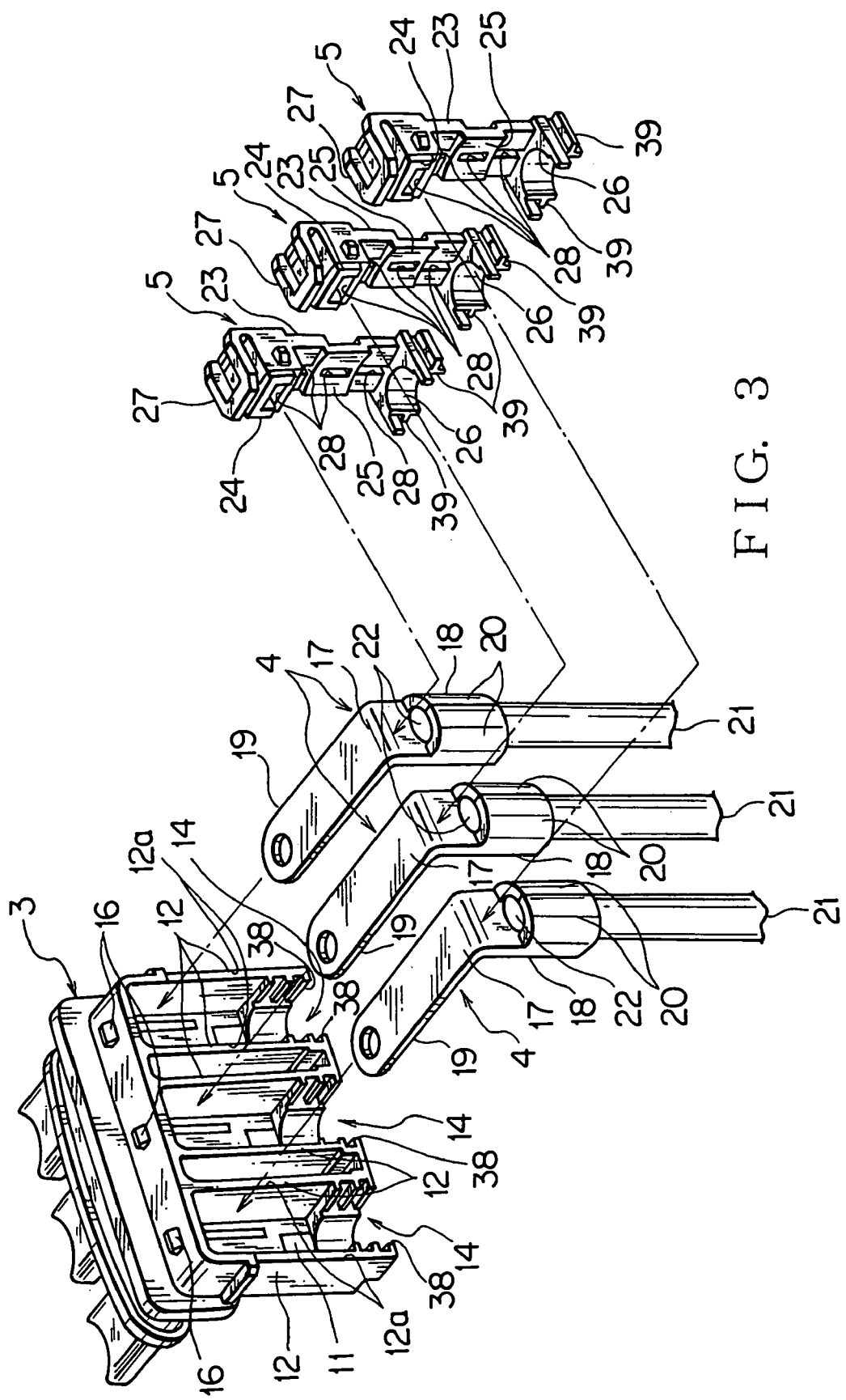
FIG. 3 is a perspective view showing a terminal holder and a connector housing of the connector of FIG. 1, which are removed from each other, and a terminal bar is connected to an electrical cable.

As illustrated in FIG. 3, the connector housing 3 is made of an electrically insulating synthetic resin and has a retainer wall 11, a plurality of partitions 12, and a plurality of through holes 13 (see FIG. 4). The retainer wall 11 is a generally flat plate, which positions a cable connection end 18 of the terminal bar 4 and an end of an electrical cable 21 thereon.

Each partition 12 is raised from the retainer wall 11 to be opposite to the insertion direction of the terminal bar 4. The partitions 12 are parallel to each other. Between adjacent ones of the partitions 12, the connector housing 3 receives the terminal bar 4 fitted with the electrical cable 21. A surface of the retainer wall 11 and the adjacent partitions 12 define a terminal accommodation chamber 14. The terminal accommodation chamber 14 is filled with a sealer 15 (see FIG. 3) made of a silicon resin.

Each through hole 13 penetrates through the retainer wall 11 and is provided in each of the terminal accommodation chambers 14. The through hole 13 is open to the terminal accommodation chamber 14 to pass through an electrical contact end 19 of the terminal bar 4.

As illustrated in FIGS. 3 and 4, the connector housing 3 has a locking protrusion 16. The locking protrusion 16 projects from an outer surface of the connector housing 3 toward an outside of the connector housing 3.

Furthermore, the partition 12 of the connector housing 3 has a slide groove 38 positioned at an end of the partition 12 on an opposite side of the through hole 13. The slide groove 38 extends perpendicular to the retainer wall 11 along a radial direction of the electrical cable 21 positioned on the retainer wall 11.

The terminal bar 4 is a comparatively thick plate made of an electrically conductive material. The terminal bar 4 unitarily has a main plate 17, the cable connection end 18, and the electrical contact end 19. The terminal main plate 17 is bent between the cable connection end 18 and the electrical contact end 19 to define an L-shaped side surface.

The cable connection end 18 is positioned at one end of the terminal main plate 17 and has a pair of crimping wings 20 for crimping a core 22 of the electrical cable 21. The cable connection end 18 electrically connects to the core 22 of the electrical cable 21 by crimping the core 22 with the wings 20. The cable connection end 18 is received in the terminal accommodation chamber 14. The core 22 has an oblong section.

Each electrical cable 21 is secured to the cable connection end 18 of each terminal bar 4. Around the electrical cable 21, the mesh sheet 10 of an electrically shielding material is arranged to enclose the electrical cable 21. The mesh sheet 10 is a sheet consisting of fine conductors to serve as an electrical shield member.

The electrical contact end 19 is a plate positioned at the other end of the terminal main plate 17. The electrical contact end 19 penetrates through the hole 13 to extend outward from the connector housing 3 of the connector 1 when the cable connection end 18 is received in the terminal accommodation chamber 14. The electrical contact end 19 electrically connects to an electric instrument such as the inverter.

Each holder 5 is associated with each terminal accommodation chamber 14 and with each terminal bar 4. The holder 5 is made of an electrically insulating synthetic resin and has a base plate 23, a terminal retaining boss (first boss) 24, a connection portion retaining boss (second boss) 25, a cable retaining boss (third boss) 26, and a plurality of through holes 28 as illustrated in FIGS. 3 to 6.

The base plate 23 is flat in conformity with the shape of the terminal accommodation chamber 14. The base plate 23 is positioned to be spaced from and parallel to the retainer wall 11.

The terminal retaining boss 24 projects from the base plate 23 to be opposed to the retainer wall 11. The terminal retaining boss 24 abuts against the terminal main plate 17 of the terminal bar 4 received in the terminal accommodation chamber 14 to press the terminal main plate 17 inward in the terminal accommodation chamber 14. A front surface of the terminal retaining boss 24 is flat to abut against the terminal main plate 17.

The connection portion retaining boss 25 projects from the base plate 23 to be opposed to the retainer wall 11. The connection portion retaining boss 25 abuts against the crimping wings 20 of the cable connection end 18 received in the terminal accommodation chamber 14 to press the cable connection end 18 inward in the terminal accommodation chamber 14. A front surface of the connection portion retaining boss 25 is circularly curved along a contour of the crimping wings 20 to abut against the wings 20.

The cable retaining boss 26 projects from the base plate 23 to be opposed to the retainer wall 11. The cable retaining boss 26 abuts against the electrical cable 21 received in the terminal accommodation chamber 14 to press the electrical cable 21 inward in the terminal accommodation chamber 14. A front surface of the cable retaining boss 26 is circularly curved along a contour of the electrical cable 21 to abut against the cable 21.

The extending distances of the retaining bosses 24, 25, and 26 are determined to press the terminal main plate 17, the cable connection end 18, and electrical cable 21 received in the terminal accommodation chamber 14 against the connector housing 3 to correctly position them in the terminal accommodation chamber 14 when a lock arm 27 discussed later has engaged with the locking protrusion 16.

The lock arm 27 is positioned to be contiguous with the base plate 23 and to extend from an end of the base plate 23 to be opposed to the connector housing 3. The lock arm 27 is resilient enough to engage with the locking protrusion 16.

Furthermore, the holder 5 has a sliding projection 39 to seal the connector housing 3. The sliding projection 39 is positioned in an end side adjacent to the crimping wing 20 of the base plate 23. The sliding projection 39 protrudes from each lateral periphery of the base plate 23. The sliding projection 39 extends perpendicular to the base plate 23 along a radial direction the electrical cable 21. The sliding projection 39 advances into the slide groove 38 to guide the holder 5 when the holder 5 is moved along the radial direction of the electrical cable 21 to be attached to the connector housing 3. The sliding projection 39 prevents a sealer 15 filled in the connector housing 3 from leaking outside from the connector housing 3.

The holder 5 is received in the terminal accommodation chamber 14, i.e. in the connector housing 3 to be attached to the connector housing 3 while the lock arm 27 engages with the locking protrusion 16. A rear surface 23a of the base plate 23 becomes flush with a free end 12a of partition 12 when the holder 5 has been attached to the connector housing 3. The rear surface 23a of the holder 5 serves as an outer wall of the connector housing 3.

Each hole 28 penetrates through each of the base plate 23, the terminal retaining boss 24, and the connection portion retaining boss 25. The through holes 28 pass the sealer 15 to fill the terminal accommodation chamber 14 of the connector housing 3 to allow the sealer 15 to spread into the whole space of terminal accommodation chamber 14. The sealer 15 is made of a silicon resin material.

Thus configured connector 1 is assembled as described hereinafter. First, the wings 20 crimp the electrical cable 21 such that an exposed core end of the electrical cable 21 is secured to the cable connection end 18 of the terminal bar 4. Then, the terminal bar 4 with the electrical cable 21 is inserted into the terminal accommodation chamber 14, while the electrical contact end 19 of the terminal bar 4 penetrates through the hole 13. During the insertion, the retainer wall 11 and the base plate 23 are spaced from and parallel to each other, while the cable connection end 18 keeps parallel to the retainer wall 11 and the base plate 23. Also, the projection 39 is inserted into the slide groove 38 along a radial direction of the electrical cable 21 to mate the holder 5 with the connector housing 3.

The holder 5 is inserted gradually into the terminal accommodation chamber 14 of the connector housing 3, while the bosses 24, 25, and 26 keep opposed to the terminal bar 4 and the end of the electrical cable 21. As illustrated in FIG. 7, each of bosses 24, 25, and 26 abuts an associated one of the terminal main plate 17, the cable connection end 18, and the electrical cable 21. The holder 5 is further forced into the terminal accommodation chamber 14 of the connector housing 3, so that the terminal bar 4 moves inward in the terminal accommodation chamber 14.

Figure 9:
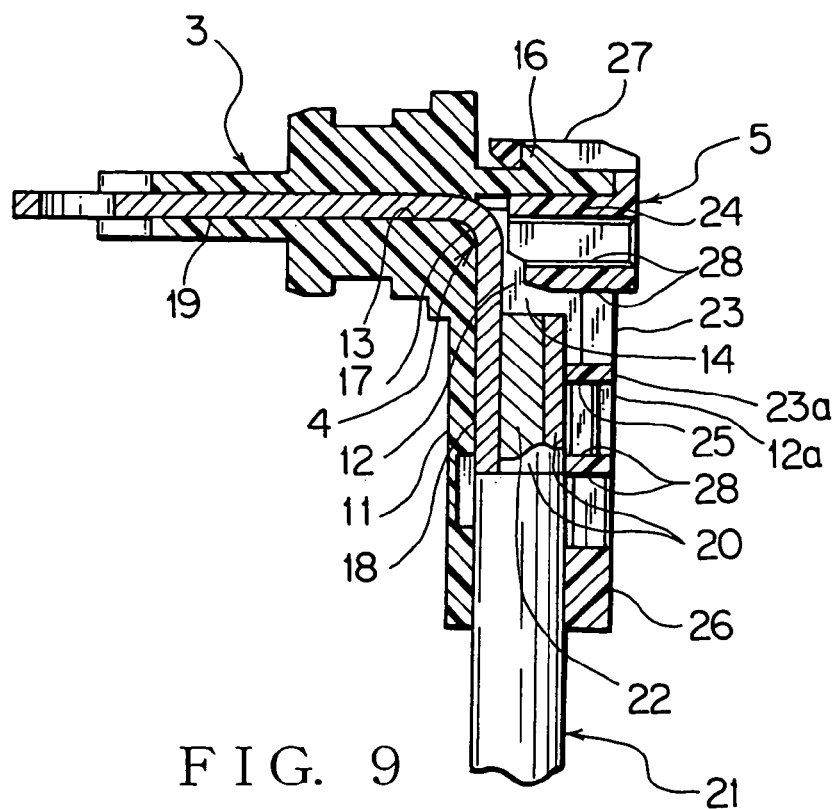
FIG. 9 is a sectional view showing a state in which the connector housing has received the terminal bar of FIG. 8.

Then, as illustrated in FIG. 8, the lock arm 27 contacts the locking protrusion 16 to resiliently deflect to ride on the locking protrusion 16. The lock arm 27 rides over the locking protrusion 16 to engage with the locking protrusion 16 as illustrated in FIG. 9.

At this stage, each of bosses 24, 25, and 26 presses an associated one of the terminal main plate 17, the cable connection end 18, and the electrical cable 21 against the connector housing 3 along the radial direction of the electrical cable 21. Thus, the holder 5 presses the terminal bar 4 and the electrical cable 21 against the connector housing 3 to secure the terminal bar 4 and the electrical cable 21 in the connector housing 3.

Thereby, the holder 5 positions the terminal bar 4 at a predetermined location within the connector housing 3, while the end surface 12a of the connector housing 3 becomes flush with the rear surface 23a of the holder 5. After the securing of the terminal bar 4 and the holder 5 within the connector housing 3, the sealer 15 made of a silicon resin material fills the terminal accommodation chamber 14 of the connector housing 3 through the hole 28 of the terminal retaining boss 24, while the sliding projections 39 prevent the sealer 15 from leaking out of the connector housing 3.

Next, the pair of case bodies 6 and 7 receive the connector housing 3 with the holder 5, and the case bodies 6 and 7 are coupled to each other. After the covering case 2 has received the connector housing 3 and the holder 5, the fasteners 9 are fitted on the covering case 2 such that an end of the mesh sheet 10 of the electrical cable 21 is sandwiched between the covering case 2 and the fasteners 9. The mesh sheet 10 encloses the electrical cable 21. Thus, the connector 1 is completed.

The electrical contact end 19 of the terminal bar 4 of thus configured connector 1 is electrically connected to a busbar of an electric instrument such as an inverter and mounted on the electric instrument. Meanwhile, the cable 21 is electrically connected to a motor through another connector (not shown). Thereby, the connector 1 serves to lead an electrical power from the inverter to the motor via the electrical cable 21. The connector 1 also serves to supply an electrical power from the motor to the inverter when the motor can generates the power.

In the first embodiment, a reduced depth dimension is achieved for each of the holder 5 and the connector housing 3 since the holder 5 presses the terminal bar 4 against the connector housing 3 to secure it to the connector housing 3. Thus, the connector 1 can have a reduce size.

The holder 5 presses the terminal bar 4 against the connector housing 3 so the holder 5 positions the terminal bar 4 at a predetermined position within the connector housing 3 to prevent the terminal bar 4 from being offset from the predetermined location in the connector housing 3.

The terminal bar 4 is sandwiched between the base plate 23 of the holder 5 and the retainer wall 11 of the connector housing 3 so that only a small space is required between the base plate 23 and the retainer wall 11. This reduces the depth of the connector housing 3, reducing the size of the connector 1.

The terminal retaining boss 24 projects from the base plate 23 to be opposed to the retainer wall 11. The boss 24 abuts against the terminal main plate 17 of the terminal bar 4 received in the terminal accommodation chamber 14 to press the terminal main plate 17 against the connector housing 3 along a radial direction of the electrical cable 21.

The connection portion retaining boss 25 projects from the base plate 23 to be opposed to the retainer wall 11. The boss 25 abuts against the crimping wings 20 of the cable connection end 18 received in the terminal accommodation chamber 14 to press the cable connection end 18 against the connector housing 3 along a radial direction of the electrical cable 21.

The cable retaining boss 26 projects from the base plate 23 to be opposed to the retainer wall 11. The boss 26 abuts against the electrical cable 21 received in the terminal accommodation chamber 14 to press the electrical cable 21 against the connector housing 3 along a radial direction of the electrical cable 21. Thus, the terminal bar 4 and the electrical cable 21 are correctly positioned within the connector housing 3.

The holder 5 is attached to the connector housing 3 while the lock arm 27 engages with the locking protrusion 16. Thus, The terminal bar 4 and the electrical cable 21 are correctly positioned and secured within the connector housing 3 not to be offset from the correct locations within the connector housing 3.

The holder 5 has the through holes 28 to pass the sealer 15 so that the sealer 15 fills the connector housing 3. The sealer 15 surely prevents intrusion of a liquid such as water between the holder 5 and the connector housing 3, ensuring the connector housing 3 in a waterproof performance.

Since the holder 5 is received within the connector housing 3, a smaller space between the holder 5 and the connector housing 3 reduces the sealer 15 filling the connector housing 3, allowing a manufacturing cost reduction of the connector 1.

Furthermore, the sliding projection 39 prevents the sealer 15 filling the connector housing 3 from leaking outside from the connector housing 3 to surely seal the connector housing 3.

The rear surface 23a of the holder 5 becomes flush with the end surface 12a of the connector housing 3, reducing the depth of the connector 1.

The electrical cable is covered with the mesh sheet 10. The size of the mesh sheet 10 is selected to be applied to electrical cables having different diameters, which allows a reduced manufacturing cost of the connector.

Figure 11:
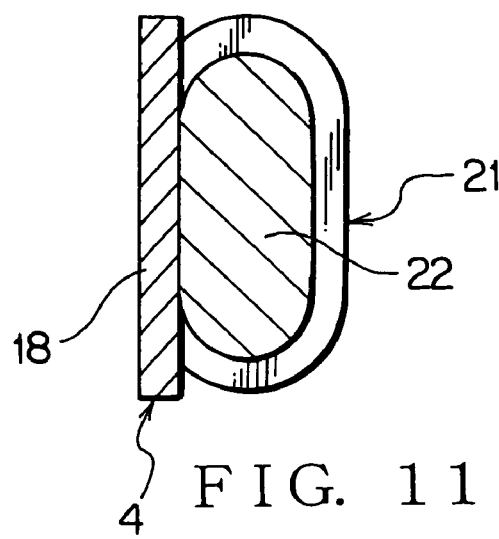
FIG. 11 is a sectional view taken along line XI—XI to show the terminal bar and the electrical cable.

In the first embodiment, the cable connection end 18 of the terminal bar 4 has the crimping wings 20 to crimp the core 22 of the electrical cable 21. The core 22 of the electrical cable 21 of the second embodiment may have an oblong section as illustrated in FIG. 11 according to the present invention. An elongated side of the core 22 is laid on the cable connection end 18 of the terminal bar 4 as illustrated in FIG. 11, and the core 22 is directly joined (metallic bonding) to the cable connection end 18, for example, by ultrasonic welding.

Figure 10:
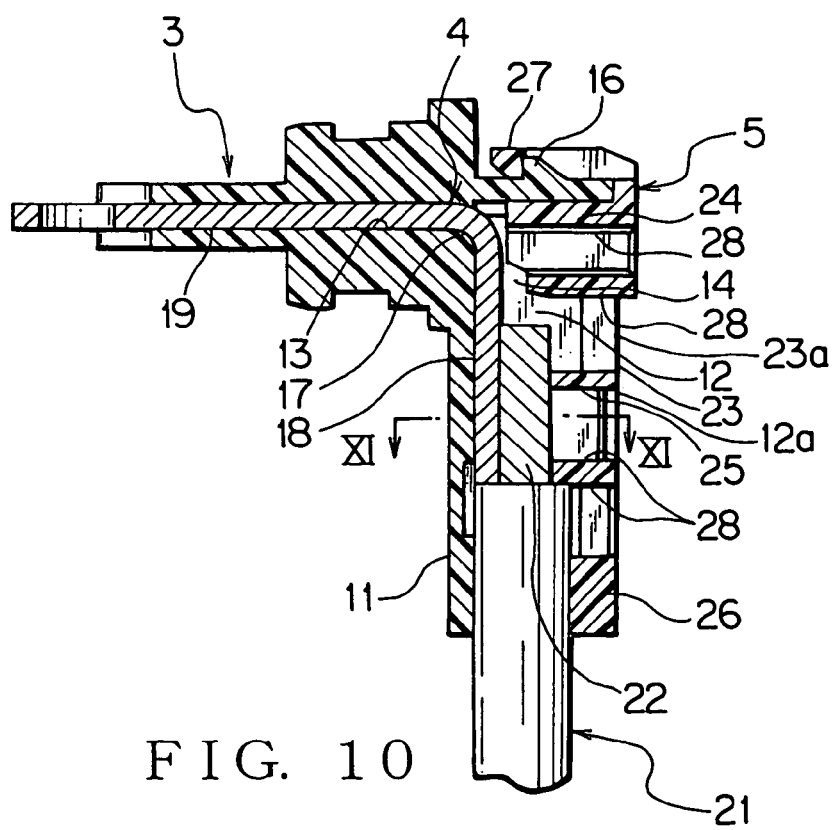
FIG. 10 is a sectional view showing a modified example of the terminal bar and the holder of FIG. 9.

In the example shown in FIGS. 10 and 11, the electrical cable 21 has the oblong section and the elongated side of the core 22 is laid on the cable connection end 18 to be directly welded to the cable connection end 18. This reduces the depth or thickness of the connector housing 3, reducing the size of the connector 1.

Furthermore, the welding joint of the core 22 and the cable connection end 18 ensures electrical connection of the terminal bar 4 and the electrical cable 21.

Figure 14:
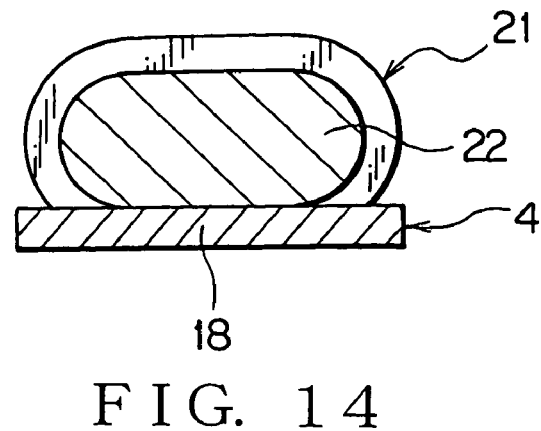
FIG. 14 is a sectional view taken along line XIV—XIV of FIG. 13 to show a terminal bar and an electrical cable.
Figure 12:
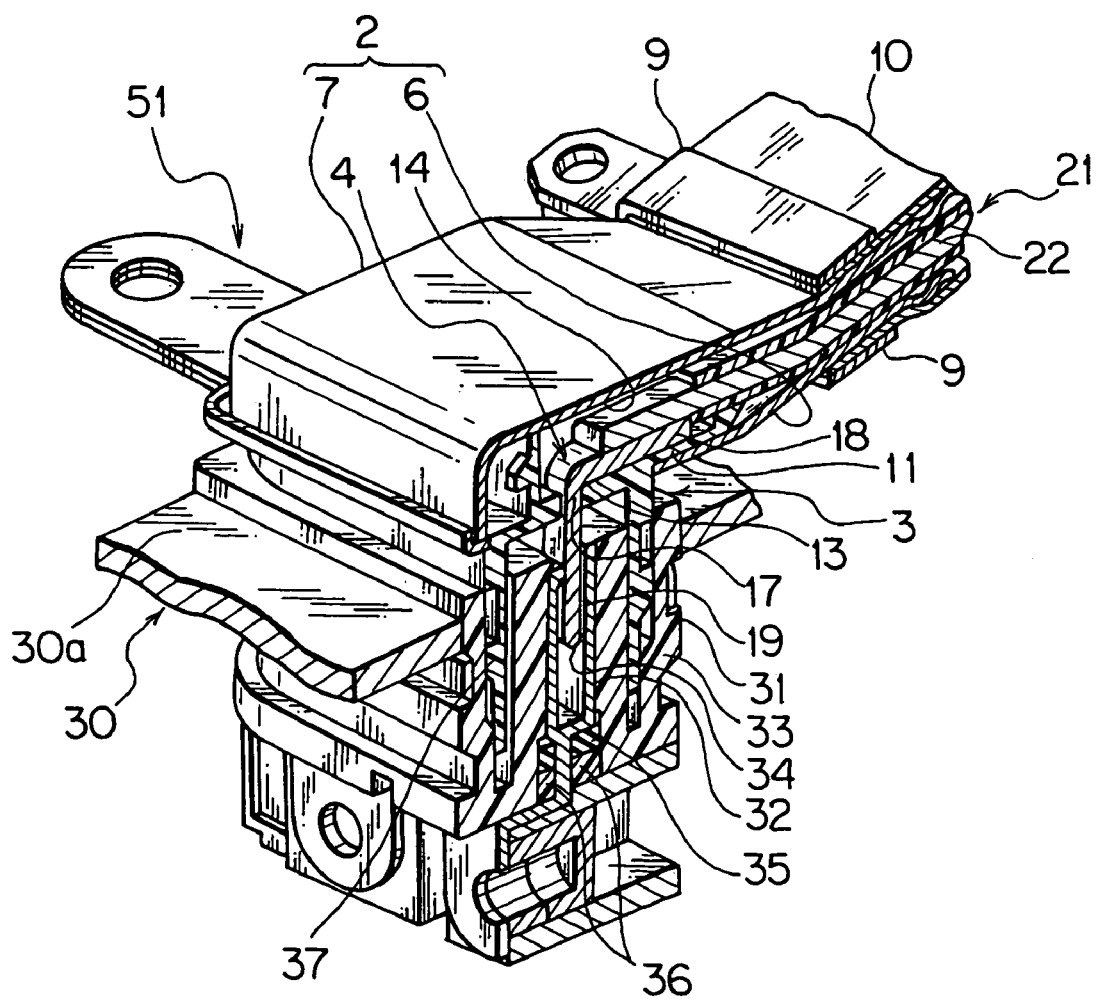
FIG. 12 is a perspective view showing a state in which a connector of a second embodiment of the present invention has engaged with an opposing connector, which also shows a section thereof.
Figure 13:
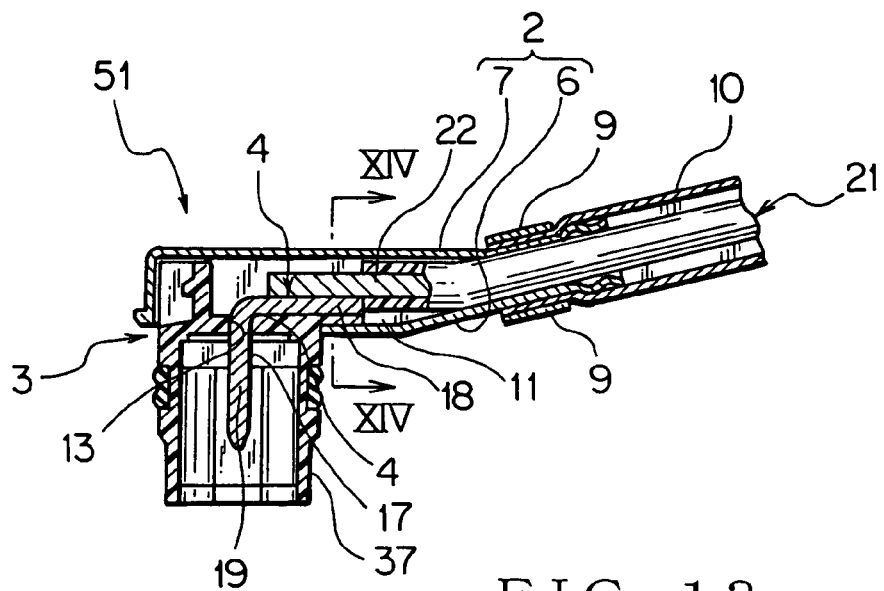
FIG. 13 is a sectional view showing the connector of FIG. 12.
Figure 15:
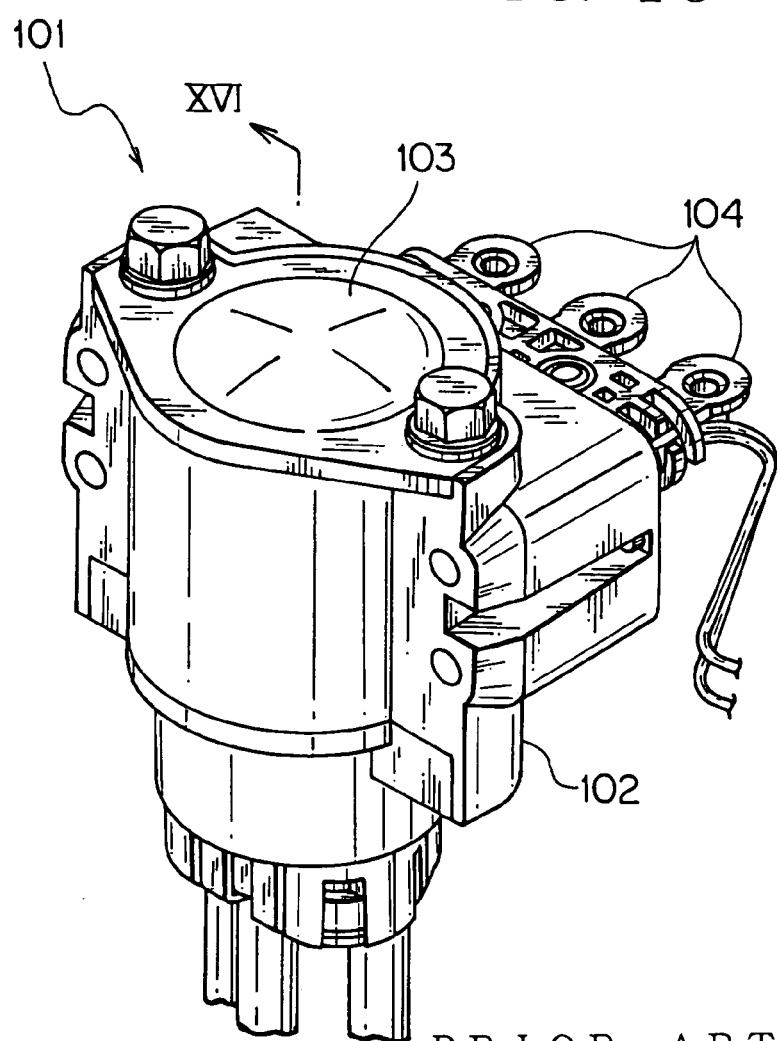
FIG. 15 is a perspective view showing a conventional connector.
Figure 16:
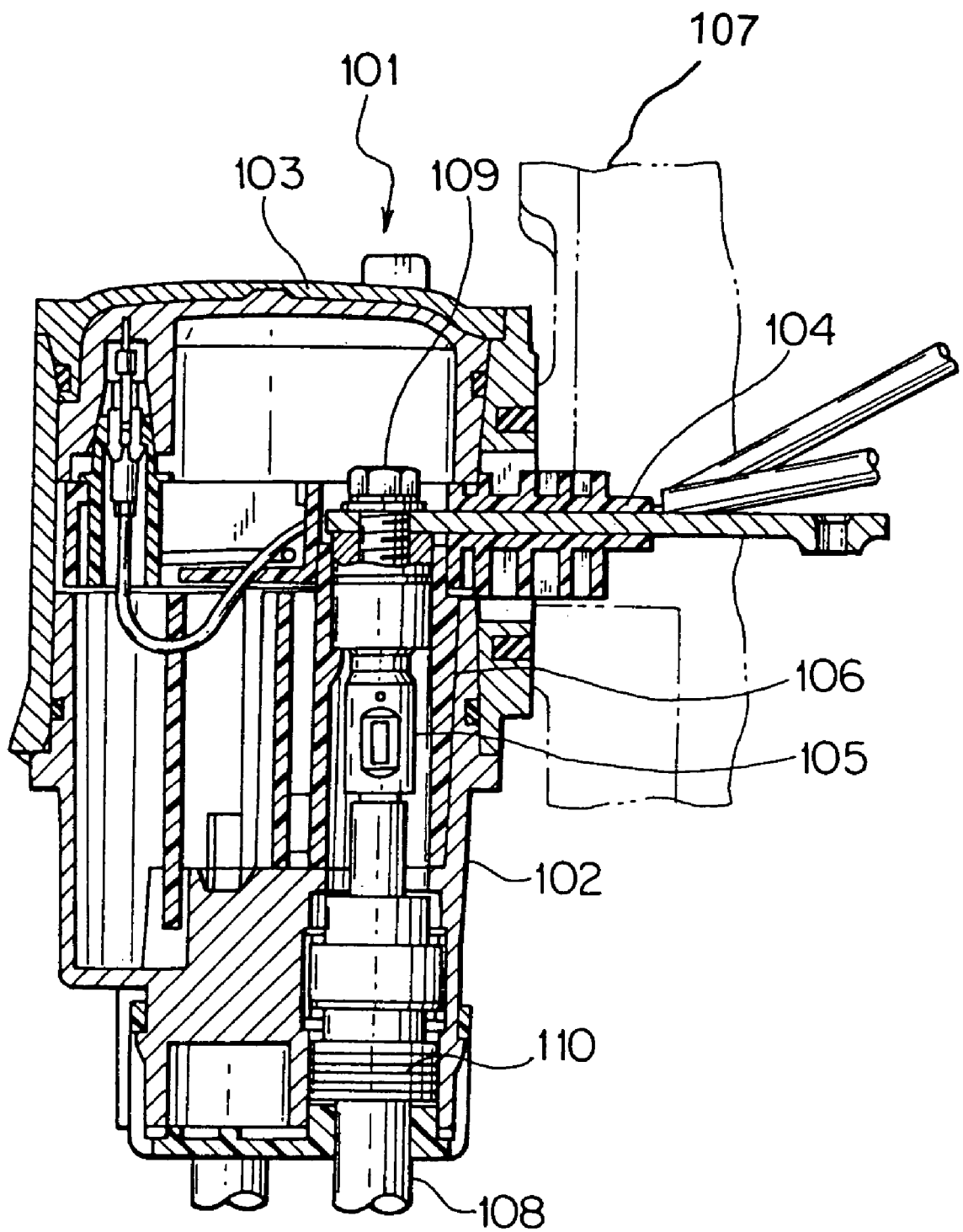
FIG. 16 a sectional view taken along line XVI—XVI of FIG. 15.

Referring to FIGS. 12 to 14, a second embodiment of the present invention will be discussed. The same components as those of the first embodiment will not be explained again since the same reference numerals are applied to them as the first embodiment. A connector 51 of the second embodiment engages with an opposing connector 31 of an electric motor 30 mounted on an electric car, a hybrid car, or a fuel-cell powered car.

The opposing connector 31 has a terminal 32 associated with the terminal bar 4 and a connector housing 33 receiving the terminal 32 as illustrated in FIG. 12. The connector housing 33 is attached to a case 30a of the motor 30. The connector housing 33 has a terminal chamber 34 to receive the terminal 32. The terminal chamber 34 is contiguous with an inner space of the case 30a of the motor 30 and with the terminal accommodation chamber 14 of the connector 1.

The case 30a of the motor 30 is filled with a lubrication oil. Thus, a packing 35 is provided to seal between an inner surface of the terminal chamber 34 and an outer surface of the terminal 32 at an opening of the terminal chamber 34. The sealing material 36 and the packing 35 prevent the lubrication oil in the case 30a of the motor 30 from leaking into the terminal accommodation chamber 14 of the connector housing 3 or to the outside of the motor 30.

As illustrated in FIG. 13, the connector 51 does not have the holder 5. Moreover, the connector housing 3 of the connector 51 unitarily has a hood 37 engaged with the opposing connector 31.

The core 22 of the electrical cable 21 has an oblong section, and an elongated side of the core 22 is laid on the cable connection end 18 of the terminal bar 4 as illustrated in FIG. 14. The cable connection end 18 of the terminal bar 4 is welded to the core 22, for example, by ultrasonic welding. This reduces the depth or thickness of the connector housing 3, reducing the size of the connector 1. Furthermore, the welding joint of the core 22 and the cable connection end 18 ensures electrical connection of the terminal bar 4 and the electrical cable 21.

Note that the discussed embodiments are representative aspects of the present invention and do not limit the present invention. Those skilled in the art field will be able to provide another embodiment within the sprit of the present invention.

What is claimed is:

1. A terminal holder attached to a connector housing receiving a terminal piece connected to an electrical cable, wherein the holder presses the terminal piece against a wall of the connector housing so that the terminal piece is sandwiched between the retainer wall and the holder to secure the terminal piece in the connector housing;
   wherein the holder is moved toward the connector housing along a radial direction of the electrical cable, when the holder is attached to the connector housing and presses the terminal piece against the wall of the connector housing;
   wherein the connector housing includes a retainer wall having a surface for positioning the terminal piece and the electrical cable, wherein the holder has a base plate spaced from the opposed to the retainer wall, the terminal piece and the electrical cable being positioned between the retainer wall and the base plate of the holder, the holder having a first boss projecting from the base plate toward the retainer wall such that the first boss can contact a main plate of the terminal piece to press the main plate against the retainer wall; and
   wherein the terminal piece has a cable connection end connecting to a core of the electrical cable, and wherein the holder has a second boss projecting from the base plate toward the retainer wall such that the second boss can contact the cable connection end of the terminal piece to press the cable connection end against the retainer wall.

2. The holder as recited in claim 1, wherein the holder has a third boss projecting from the base plate toward the retainer wall such that the third boss can contact the electrical cable connected to the terminal piece to press the electrical cable against the retainer wall.

3. The holder as recited in claim 1, wherein the connector housing includes a locking member, and wherein the base plate of the holder has a locked portion engaged with the locking member when the holder is attached to the connector housing.

4. A terminal holder attached to a connector housing receiving a terminal piece connected to an electrical cable,
   wherein the holder presses the terminal piece against a retainer wall of the connector housing so that the terminal piece is sandwiched between the retainer wall and the holder to secure the terminal piece in the connector housing, and
   wherein the terminal holder has a through hole to lead a sealing material to fill an inner space of the connector housing after the holder has attached to the connector housing.

5. The holder as recited in claim 4, wherein the holder has a stopper to prevent the sealing material from leaking out from the connector housing.

6. The holder as recited in claim 4, wherein the holder has an outer surface that becomes flush with an outer surface of the connector housing when the holder has attached to the connector housing.

7. An electrical connector comprising a terminal piece connected to an electrical cable, a connector housing receiving the terminal piece, and a terminal holder attached to the connector housing, wherein the holder presses the terminal piece against a wall of the connector housing so that the terminal piece is sandwiched between the wall and the holder to secure the terminal piece in the connector housing;
   wherein the holder is moved toward the connector housing along a radial direction of the electrical cable, when the holder is attached to the connector housing and presses the terminal piece against the wall of the connector housing;
   wherein the connector housing includes a retainer wall having a surface for positioning the terminal piece and the electrical cable, and wherein the holder has a base plate spaced from and opposed to the retainer wall, the terminal piece and the electrical cable being positioned between the retainer wall and the base plate of the holder, the holder having a first boss projecting from the base plate toward the retainer wall such that the first boss can contact a main plate of the terminal piece to press the main plate against the retainer wall; and
   wherein the terminal piece has a cable connection end connecting to a core of the electrical cable, and wherein the holder has a second boss projecting from the base plate toward the retainer wall such that the second boss can contact the cable connection end of the terminal piece to press the cable connection end against the retainer wall.

8. The connector as recited in claim 7, wherein the holder has a third boss projecting from the base plate toward the retainer wall such that the third boss can contact the electrical cable connected to the terminal piece to press the electrical cable against the retainer wall.

9. The connector as recited in claim 7, wherein the connector housing includes a locking member, and wherein the base plate of the holder has a locked portion engaged with the locking member when the holder is attached to the connector housing.

10. The connector as recited in claim 9, wherein the connector housing has a through hole to lead a sealing material to fill an inner space of the connector housing after the holder has attached to the connector housing.

11. The connector as recited in claim 10, wherein the holder has a stopper to prevent the sealing material from leaking out from the connector housing.

12. The connector as recited in claim 10, wherein the holder has an outer surface that becomes flush with an outer surface of the connector housing when the holder has been attached to the connector housing.

13. The connector as recited in claim 7, wherein the electrical cable has an oblong section, the electrical cable having an outer surface extending along a longitudinal direction of the electrical cable, the electrical cable abutted against the outer surface, and wherein the terminal piece is connected to a core of the electrical cable.

14. An electrical connector having a terminal piece connected to an electrical cable and a connector housing receiving the terminal piece, wherein the electrical cable has a core of an oblong section, and wherein the terminal piece is welded to a longitudinal surface of the core of the electrical cable, and wherein the connector housing is received in an electrically shielding case, the electrical cable covered with an electrically shielding sheet, the connector having a fastener that pinches an end of the electrically shielding sheet against the case.

15. An electrical connector comprising a terminal piece connected to an electrical cable, a connector housing receiving the terminal piece, and a terminal holder attached to the connector housing, wherein the holder presses the terminal piece against a wall of the connector housing so that the terminal piece is sandwiched between the wall and the holder to secure the terminal piece in the connector housing, and wherein the connector housing is received in an electrically shielding case, the electrical cable covered with an electrically shielding sheet, the connector having a fastener that pinches an end of the electrically shielding sheet against the case.

* * * * *